United States Patent
Grossmann (10) Patent No.: US 6,948,411 B2
(45) Date of Patent: Sep. 27, 2005

(54) MACHINE TOOL

(75) Inventor: Walter Grossmann, Baltmannsweiler (DE)

(73) Assignee: Index-Werke GmbH & Co. KG Hahn & Tessky, Esslingen (DE)

( * ) Notice: Subject to any disclaimer, the term of this patent is extended or adjusted under 35 U.S.C. 154(b) by 0 days.

(21) Appl. No.: 10/675,800

(22) Filed: Sep. 30, 2003

(65) Prior Publication Data

US 2004/0129120 A1 Jul. 8, 2004

Related U.S. Application Data

(63) Continuation of application No. PCT/EP02/03355, filed on Mar. 26, 2002.

(30) Foreign Application Priority Data

Apr. 5, 2001 (DE) ......................................... 101 16 994

(51) Int. Cl.[7] ............................................... B23B 7/00
(52) U.S. Cl. ............................. 82/129; 82/117; 82/118; 82/121
(58) Field of Search ........................ 82/117, 118, 120, 82/121, 129

(56) References Cited

U.S. PATENT DOCUMENTS 5,127,140 A 7/1992 Oiwa et al.
5,157,824 A * 10/1992 Kojima Hiroshi et al. .. 29/27 R
6,626,075 B2 * 9/2003 Hirose et al. .................. 82/118

FOREIGN PATENT DOCUMENTS

| DE | 447 695   | 7/1927  |
| EP | 0 999 002 | 5/2000  |
| EP | 1 160 052 | 12/2001 |

* cited by examiner

*Primary Examiner*—Willmon Fridie, Jr.
(74) *Attorney, Agent, or Firm*—Lipsitz & McAllister, LLC (57) ABSTRACT

The invention relates to a machine tool, especially a lathe, comprising a machine frame upon which a first and second spindle housing carrier are arranged in such a way that they can move in a direction Z in relation to each other; a first working spindle; a second working spindle; a first tool carrier which is associated with the first working spindle; a second tool carrier which is associated with the second working spindle, said first and second tool carriers being arranged on the same side of the spindle axis; and a machine control unit. In order to improve upon one such machine tool, whereby more work tools can be used simultaneously on workpieces, the spindle housing carriers extend sidewards away from the spindle housings and a third tool carrier, which can move at least in a direction X and which is associated with one of the working spindles, is provided between the spindle housing carriers of the first and second working spindles on a side of the spindle axis which is approximately opposite to the first and second tool carrier.

40 Claims, 6 Drawing Sheets

MACHINE TOOL

The present disclosure relates to the subject matter disclosed in PCT application No. PCT/EP02/03355 of Mar. 26, 2002, which is incorporated herein by reference in its entirety and for all purposes.

BACKGROUND OF THE INVENTION

The invention relates to a machine tool, especially a lathe, comprising a machine frame upon which a first spindle housing carrier and a second spindle housing carrier are supported in such a way that they can be moved in a Z direction in relation to each other, a first working spindle, which receives a first workpiece and is mounted rotatably about a spindle axis in a spindle housing seated on the first spindle housing carrier, a second working spindle, which is disposed coaxially with respect to the first working spindle, receives a second workpiece and is mounted rotatably about a spindle axis in a spindle housing seated on the second spindle housing carrier, a first tool carrier, which is movable in an X direction and is associated with the first working spindle for the machining of first workpieces disposed in the latter, a second tool carrier, which is movable in an X direction and is associated with the second working spindle for the machining of second workpieces disposed in the latter, the first and second tool carriers being disposed on the same side of the spindle axis, and a machine control unit for controlling the relative movements between the first workpiece and the tools of the first tool carrier and the second workpiece and the tools of the second tool carrier.

Machine tools of this type are known from the prior art. With machine tools of this type, there is generally the requirement that the largest possible number of tools can be used simultaneously.

The invention is therefore based on the object of improving a machine tool of the generic type in such a way that still more tools can be used simultaneously on the workpieces.

SUMMARY OF THE INVENTION

This object is achieved in the case of a machine tool of the type described at the beginning according to the invention by the spindle housing carriers extending laterally away from the spindle housings and by a third tool carrier, which can be moved at least in an X direction and is associated with one of the working spindles, being provided between the spindle housing carriers of the first and second working spindles on a side of the spindle axes which is approximately opposite from the first and second tool carriers.

The advantage of the solution according to the invention can be seen in that it allows the number of tools which can be used to be increased in a simple way.

To allow the working spindles to move toward each other to the extent that the transfer of a workpiece from one spindle to the other is possible, it is necessary that the tool carrier does not extend very far in the Z direction, in order to keep the projection of the working spindle with respect to the spindle housing carriers as small as possible and consequently improve the rigidity of the machine.

For this reason, it is preferably provided that the third tool carrier is disposed on an X slide, which is guided on an X slide base by X guides disposed in an X guiding plane perpendicular to the spindle axes.

The advantage of the solution can be seen in that it allows the effect to be achieved that the third tool carrier with the X slide is slender in the Z direction, although an adequately large supporting surface can be realized in the X guiding plane to guide the X slide as rigidly as possible on the slide base.

A still more advantageous embodiment of the solution according to the invention, in which still more tools can be brought into engagement, provides that a fourth tool carrier is disposed between the first and second spindle housing carriers and that the third tool carrier is associated with the first working spindle and the fourth tool carrier is associated with the second working spindle. Consequently, altogether four tool carriers are available, so that in each case two tools can be brought into engagement on the first workpiece and two tools can be brought into engagement on the second workpiece.

It is particularly advantageous if the fourth tool carrier is disposed on an X slide which is guided on an X slide base in X guides disposed in the X guiding plane perpendicular to the spindle axes. Consequently, the fourth tool carrier also extends little in the Z direction, so that once again this requires the spindles to project as little as possible beyond the spindle housing carrier slides.

With regard to the way in which the third and fourth tool carriers are disposed, no further details have been specified so far. So it would be conceivable, for example, to dispose the third and fourth tool carriers on a common X slide.

However, it is particularly advantageous with regard to production flexibility if the third tool carrier and the fourth tool carrier are respectively seated on an X slide of their own.

Furthermore, there are various possible ways of disposing the X slides respectively associated with the tool carriers. A simple solution provides that the X slide of the third tool carrier and the X slide of the fourth tool carrier are seated on a common X slide base. This solution has the advantage that it provides a solution of a simple structural design for disposing the third and fourth tool carriers.

In this case, the X slide base may either be disposed in a stationary manner on the machine frame or still be displaceable, for example, in the Z direction or in the Y direction.

Another advantageous solution provides that each of the X slides has an X slide base of its own. This solution has the advantage that it increases the flexibility, in particular since, for example, each slide base can be formed in such a way that it is displaceable in the Z direction or Y direction.

With regard to the forming of the X guides in the X guiding plane, no further details have been specified in connection with the explanation so far of the individual exemplary embodiments. To obtain an adequately rigid support in relation to the X guiding plane, it is preferably provided that the X guides have in a transverse direction running in the X guiding plane and transversely to the X direction a spacing from each other which corresponds at least to an effective diameter of the workpiece receptacle in the respective working spindles.

As an alternative or in addition to this, an advantageous dimensioning specification for the support in the X guiding plane provides that the X guides have in a transverse direction running in the X guiding plane and transversely to the X direction a spacing from each other which is of the order of magnitude of an extent of the respective tool carrier in the transverse direction.

The tool carrier is in this case preferably formed as a tool turret, so that the spacing in the transverse direction approximately corresponds for example in this case to the extent of the turret housing in the transverse direction.

A particularly advantageous form of construction which is as slender as possible in the Z direction provides that the X slide has a slide body which is guided by the X guides close to its edge sides that are spaced apart in the transverse direction.

An extremely suitable solution provides that the slide body is guided by X guides seated on edge surfaces running transversely to the X guiding surface.

With regard to the forming of the X slide base, it is conceivable—as already mentioned—to dispose the slide base in a stationary manner.

A particularly advantageous solution provides, however, that the X slide base is formed as a Z slide guided by Z guides.

The Z slide is in this case preferably guided by a Z guide on the spindle housing carrier which has its working spindle associated with the tool carrier disposed on the Z slide.

A Z guide of this type can be formed in a wide variety of ways. A particularly advantageous solution provides that the Z guide has an arm which extends from the Z slide in the direction of the spindle housing carrier guiding the latter.

To achieve particularly advantageous guidance, it is preferably provided that the arm extends beyond the spindle housing carrier, so that a great path can be realized by the Z guidance in the Z direction.

The Z guidance further comprises also a Z guiding receptacle, the arm extending through the Z guiding receptacle for said arm which is disposed on the spindle housing carrier guiding said receptacle. This provides a solution for the guidance of the Z slide which can be realized particularly easily and is stable.

With regard to a drive of the Z slide, so far no further details have been specified. The drive could, for example, be effective in relation to the machine frame. A particularly advantageous solution provides that a Z axial drive is provided, with which the Z slide can be moved in relation to the respective spindle housing carrier.

It is particularly suitable in this case if the Z axial drive is effective between the arm and the spindle housing carrier guiding the latter, so that the Z position of the Z slide can always be defined in relation to the respective spindle housing carrier.

With regard to the drive motor required for the Z axial drive, it is particularly advantageous if this drive motor for the Z axial drive is held by the arm, so that a particularly simple and space-saving construction is available for disposing the drive motor.

With regard to how the X axial drive motor is disposed, likewise no further details have been specified in connection with the explanation so far of the individual exemplary embodiments. The X axial drive motor could, for example, be disposed directly on the X slide or the slide base of the same.

A particularly advantageous solution provides, however, that an X axial drive motor for the X slide is disposed at an end of the arm opposite from the Z slide and is consequently disposed in a position in which it does not take up any space in the region of the in any case confined working space.

To drive the X slide with an X drive motor of this type, it is preferably provided that a drive train extends along the arm between the X axial drive motor and the Z slide and can consequently be guided in an advantageous way with respect to the Z slide and X slide.

A particularly suitable solution provides that the drive train is led through the arm and is consequently at the same time also protected by the arm.

As an alternative or in addition to the guidance of the Z slide on the corresponding spindle housing carrier, a preferred solution provides that the Z slide is supported by at least one guiding element on a Z guide provided on the machine frame. This solution has the advantage that a direct and stable support on the machine frame, in particular close to the tool carrier, can be realized in this way.

It is even better if the Z slide is guided by a guiding element respectively on one of two Z guides disposed on the machine frame.

For the support of the Z slide, it is preferably provided in this case that at least one of the guiding elements is guided on the corresponding Z guide with a guiding length in the Z direction which is less than a guiding length accepting tilting moments of the Z slide, so that an extent of the Z slide which is as small as possible in the Z direction can be realized in this way.

It is particularly advantageous in this case if at least one of the guiding elements is guided on the corresponding Z guide in such a way that the latter only accepts forces lying in planes running transversely to the Z direction.

With regard to the Z guides, it is conceivable to provide special Z guides for the Z slide.

A particularly advantageous solution provides, however, that the Z guides disposed on the machine frame are also formed as Z guides of a further slide guided on the machine frame, so that the Z guides can be multiply used, resulting in a simpler and clearer construction of the machine tool according to the invention.

With regard to the mobility of the working spindles in relation to one another, so far no details have been specified. So a particularly advantageous embodiment of the machine tool according to the invention provides that at least one of the spindle housing carriers forms a spindle housing carrier slide which can be made to move in the Z direction for the working spindle carried by said slide, so that the working spindles can be advantageously made to move in the Z direction by this spindle housing carrier slide.

It is particularly advantageous if both spindle housing carriers are formed as spindle housing carrier slides which can be made to move in the Z direction.

With regard to the guidance of the spindle housing carrier slides in the Z direction, so far no further details have been specified.

So a particularly advantageous solution provides that a Z guiding plane, in which the Z guides for the spindle housing carrier slide lie, runs transversely to a setting-up area of the machine frame. By being disposed in this way, there is the advantage that the spindle housing carrier slides can consequently be disposed in an easily accessible and space-saving manner.

With a solution of this type it is preferably provided that the Z slide is guided at least on one of the two spaced-apart Z guides for the respective spindle housing carrier slide. This solution has not only the advantage that it is much simpler, but also the advantage that inaccuracies in the relative positioning of the Z slide with respect to the respective working spindle have less of an effect in the Z guides, since the Z guides fix the way in which both the working spindle and the Z slide are disposed.

Particularly advantageous support is achieved when the Z slide is guided on both spaced-apart Z guides for the respective spindle housing carrier slide, since optimum support of the Z slide as close as possible to the tool carrier can be achieved in this way.

With respect to the function of the machine tool according to the invention, so far no further details have been specified.

So a particularly preferred solution provides that, in a machining mode, the third tool carrier can be made to move in relation to the first working spindle and the fourth tool carrier can be made to move in relation to the second working spindle into the Z positions required for the machining of the first workpiece and second workpiece, respectively.

With regard to the first tool carrier, no further details have been specified in this connection. It is particularly advantageous in this case if, with the machine control unit in the operating mode, the first tool carrier and the first working spindle can be made to move in relation to each other into the Z positions required for the machining of the first workpiece.

Consequently, a wide variety of solutions are conceivable for the machining of the first workpiece.

For example, it is conceivable to dispose the first working spindle in a stationary manner and consequently to move the first tool carrier and the third tool carrier in relation to the stationary first working spindle.

Another advantageous solution envisages disposing the first tool carrier in a stationary manner and then moving the first working spindle in relation to the first tool carrier and additionally the third tool carrier in relation to the first working spindle, in which case, when there are movements of the first working spindle in relation to the first tool carrier, on account of the direct coupling with the first spindle housing carrier slide the third tool carrier is moved as it were "piggyback" with respect to the first working spindle together with the latter, and consequently the control of the third tool carrier works with the position of the working spindle in the Z direction as a reference variable and does not expressly have to take this into account.

To increase further the multitude of functional possibilities, it is for instance also conceivable, however, to form movably in each case in the Z direction not only the first tool carrier but also the first working spindle and the third tool carrier in relation to the first working spindle, in which case the third tool carrier continues as before to be moved "piggyback" with respect to the first working spindle.

Furthermore, it is advantageous if, with the machine control unit in the machining mode, the second tool carrier and the second working spindle can be made to move in relation to each other into the Z positions required for the machining on the second workpiece.

A wide variety of solutions are also conceivable for the machining of the second workpiece, so it would be conceivable to dispose the second tool carrier in a stationary manner and to move the second working spindle in relation to the second tool carrier and additionally move the fourth tool carrier in relation to the second working spindle, said fourth tool carrier likewise being movable "piggyback" with the second working spindle.

Since one of the working spindles must be movable in the Z direction for the transfer of the workpiece between them, a further possibility would be to dispose the fourth tool carrier in a stationary manner and not to make it movable in the Z direction, so that in this case the second working spindle must be movable in relation to the fourth tool carrier in the Z direction and in addition the first tool carrier must be movable in relation to the second working spindle.

The machine tool according to the invention may in this case also combine all the alternatives presented above in connection with the machining of the first and second workpieces with one another and it is also possible to keep the first working spindle movable in the Z direction, while the second working spindle is stationary in the Z direction.

An alternative, but likewise advantageous solution provides that the third tool carrier carries tools which can be used at least on one of the workpieces, that, with the machine control unit in a machining mode, one of the working spindles is movable in relation to the third tool carrier in a way corresponding to the Z positions required for the machining of the respective workpiece by means of the tool provided on the third tool carrier for this workpiece, and what is more the tool carrier likewise associated with this working spindle is movable in relation to this working spindle in a way corresponding to the Z positions required for the machining of this workpiece by means of a tool provided on this tool carrier, likewise associated with the working spindle.

The advantage of this solution is that the third tool carrier can be stationary and both the corresponding working spindle and the corresponding further tool carrier move.

This solution has the advantage in particular that only two Z axes are required for the machining of a workpiece with two tool carriers.

It is particularly advantageous if, with the machine control unit in the machining mode, the first working spindle is movable in relation to the third tool carrier and the second working spindle is movable in relation to the fourth tool carrier into the Z positions required for the machining of the first workpiece and second workpiece, respectively.

Furthermore, it is advantageously provided that the first tool carrier is movable in relation to the first working spindle and the second tool carrier is movable in relation to the second working spindle into the Z positions required for the machining.

No further details have been specified in connection with the explanation so far of the tool carriers.

For example, tool carriers of this type could be individual tool carriers.

However, it is particularly advantageous if these tool carriers are formed as multiple tool carriers, it being possible for a multiple tool carrier of this type to be a linearly displaceable tool carrier or a turret with a turret head which is rotatable about an axis with respect to a housing.

Further features and advantages of the solution according to the invention are the subject of the description which follows and of the graphic representation of some exemplary embodiments.

DETAILED DESCRIPTION OF THE INVENTION

Figure 1:
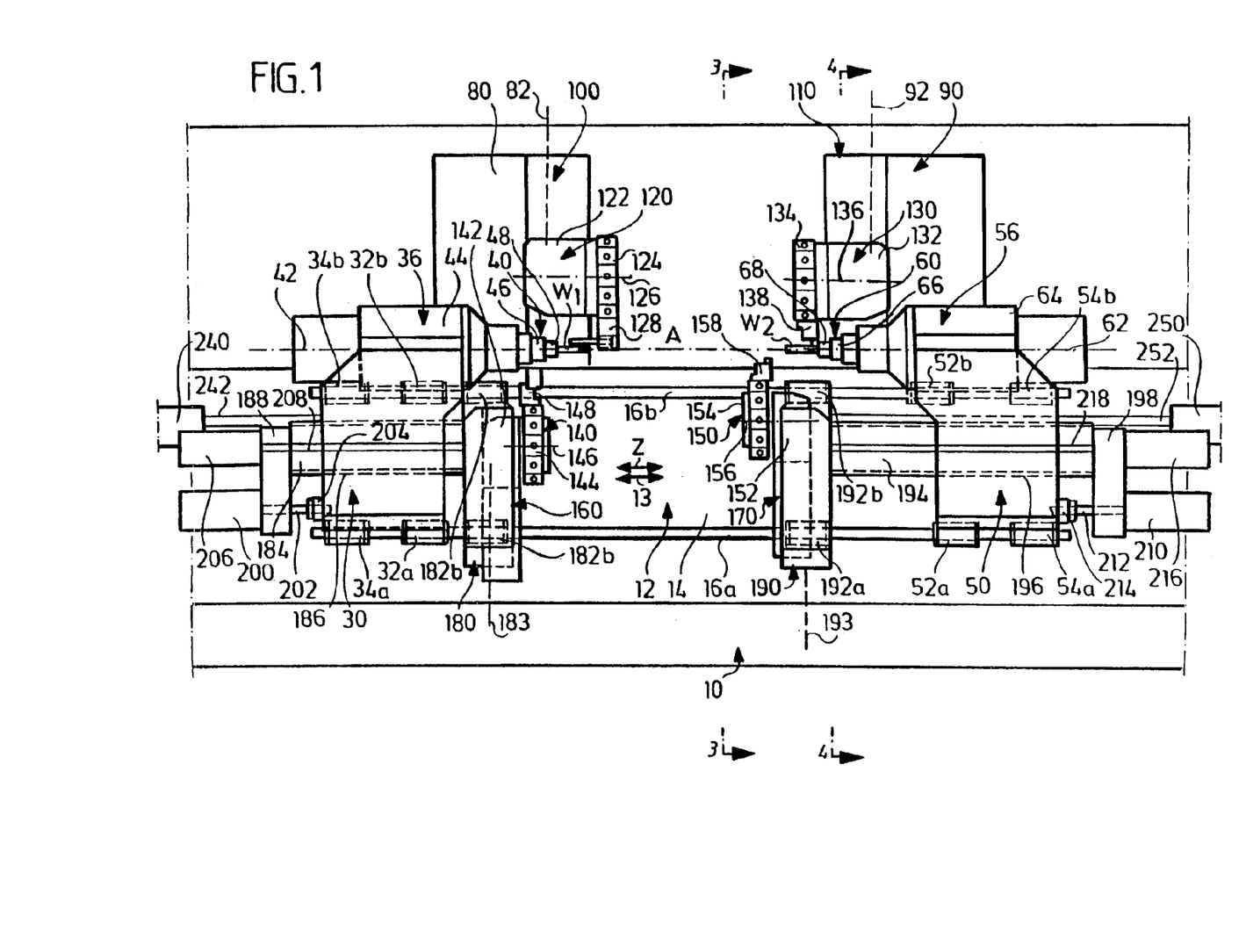
FIG. 1 shows a section along line 1—1 in FIG. 3 through a first exemplary embodiment of a machine tool according to the invention.
Figure 2:
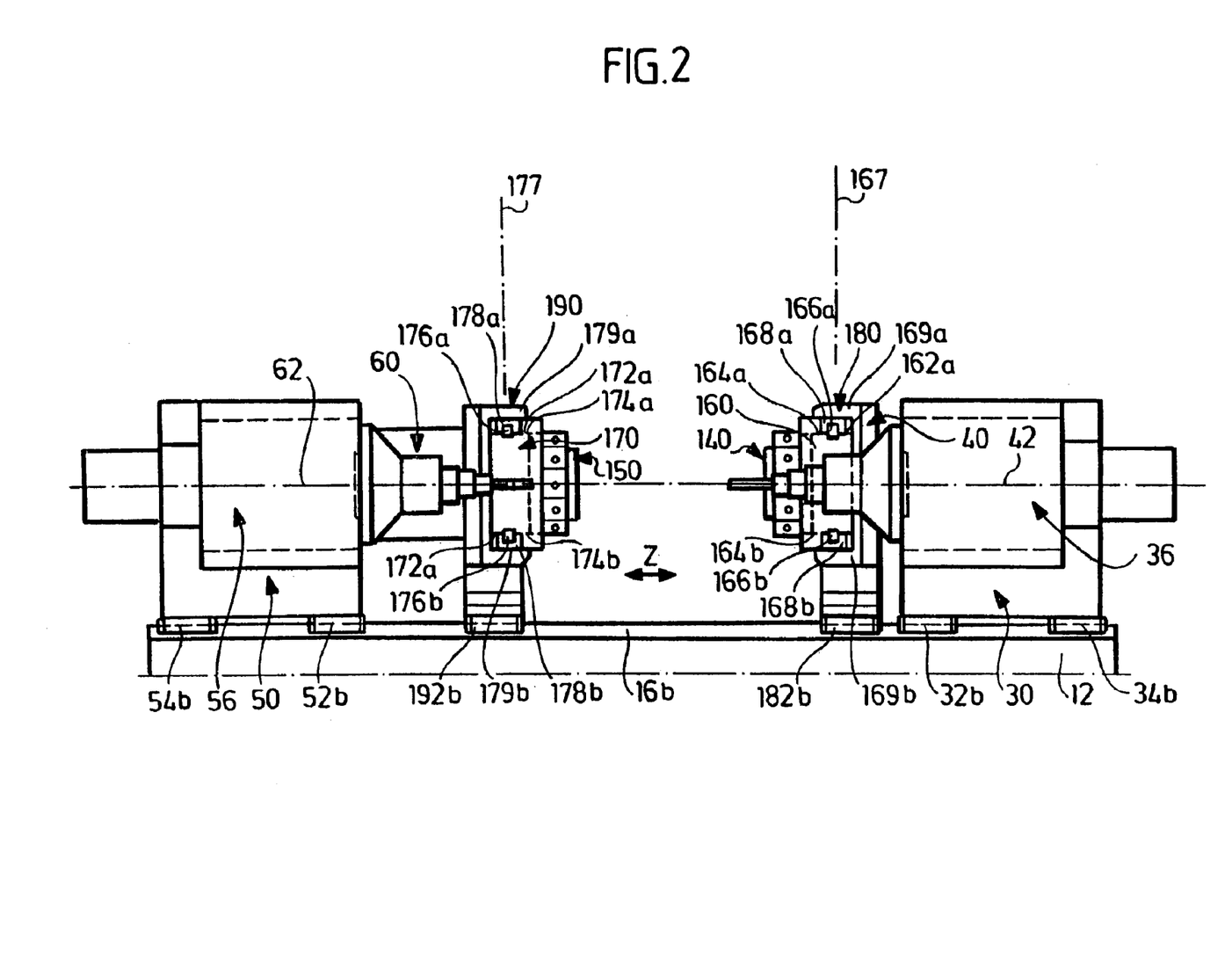
FIG. 2 shows a plan view in the direction of the arrow X in FIG. 3 with the machine bed partly broken away.
Figure 3:
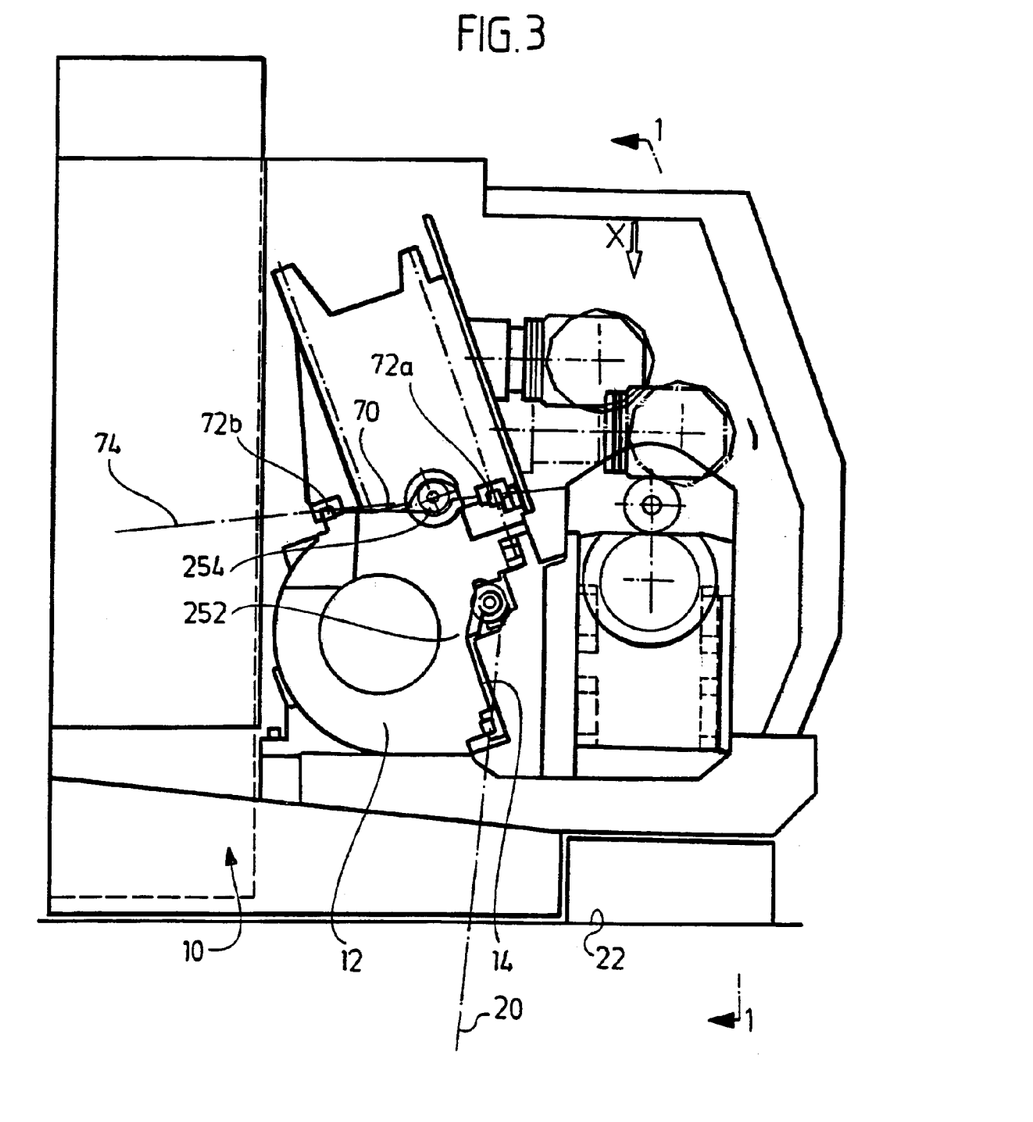
FIG. 3 shows a section along line 3—3 in FIG. 1.
Figure 4:
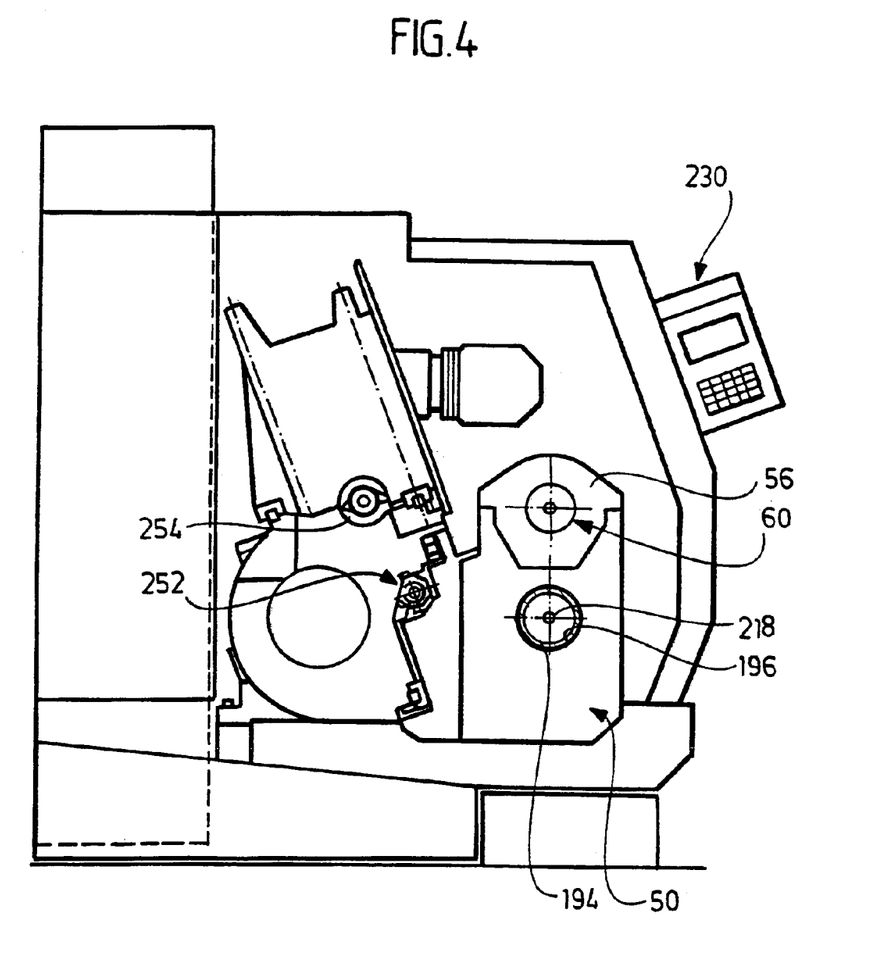
FIG. 4 shows a section along line 4—4 in FIG. 1.

An exemplary embodiment of a lathe according to the invention, represented in FIGS. 1 to 4, comprises a machine frame, designated overall by 10, with a machine bed 12, which is formed for example as a hollow body elongated in the longitudinal direction 13, as represented in FIGS. 1, 3 and 4.

Provided on a front side 14 of the machine bed 12 are two Z guides 16a and 16b, which run parallel to the longitudinal direction 13 of the machine bed and lie in a first Z guiding plane 20, which runs transversely to a setting-up area 22 on which the machine frame 10 stands. In this case, the Z guiding plane 20 also runs parallel to the longitudinal direction 13 of the machine bed 12.

On the Z guides 16a and 16b, a first spindle housing carrier slide 30 is respectively guided by two spaced-apart pairs of guiding carriages 32a and 34a, and 32b and 34b, respectively, so that the spindle housing carrier slide 30 can be moved in a Z direction along the Z guides 16 and is supported on the latter against tilting.

The first spindle housing carrier slide 30 carries a spindle housing 36, in which a first working spindle 40 is mounted rotatably about a first spindle axis 42 and can be driven by a spindle drive, preferably a spindle motor 44 integrated into the spindle housing 36.

Disposed lying opposite the first spindle housing carrier slide 30 is a second spindle housing carrier slide 50, which for its part is movably guided in the Z direction by two spaced-apart sets of guiding carriages 52a and 54a, and 52b and 54b, respectively, likewise on the Z guides 16a and 16b, respectively, and is supported against tilting.

The second spindle housing carrier slide 50 also carries a second spindle housing 56, in which a second working spindle 60 is mounted rotatably about a second spindle axis 62 and can be driven, preferably by a spindle motor 64.

In this case, the second spindle axis 62 is aligned coaxially with respect to the first spindle axis 42.

In this case, the working spindles 40 and 60 are preferably disposed in such a way that the spindle heads 46 and 66 are facing each other and have workpiece receptacles 48 and 68, respectively, in which a first workpiece W1 and a second workpiece W2 can be respectively received and fixed for turning on the lathe.

Furthermore, with coaxial alignment of the spindle axes 42 and 62, the provision that the spindle housing carrier slides 30 and 50 can be made to move means that the two working spindles 40 and 60 can be made to move toward each other to the extent that a transfer of the workpiece W1 held in the first workpiece receptacle 48 into the second workpiece receptacle 68 of the second working spindle 60 is possible, with a change of the clamped side, so that a workpiece W can be machined overall as workpiece W1 on a first side and as workpiece W2 on a second side, and consequently can be machined completely.

As represented in FIG. 3, provided on an upper side 70 of the machine bed 12 are two Z guides 72a and 72b, which likewise run parallel to the Z direction and lie in a second Z guiding plane 74, which for its part runs transversely to the first Z guiding plane 20 and approximately parallel to the setting-up area 22.

As represented in FIG. 1, guided on the Z guides 72a and 72b on the upper side 70 of the machine bed 12 are a first tool slide carrier 80 and a second tool slide carrier 90, which for their part once again form a slide carrier for a first tool slide 100 and a second tool slide 110, respectively, the tool slide 100 or 110 guided on the respective tool slide carrier 80 or 90 being guided by X guides lying in an X guiding plane 82 or 92, respectively, for example represented by the X guides 94a and 94b, the X guiding planes 82 and 92 running approximately perpendicular to the spindle axes 42 and 72, respectively.

Disposed on the tool slides 100 and 110 are tool carriers 120 and 130, respectively, which are formed for example as tool turrets, the turret housings 122 and 132 of which are seated on the respective tool carriage 100 or 110 and on the turret housing 122 or 132 of which there is respectively seated a turret head 124 or 134, which is rotatable about an axis of rotation 126 or 136 with respect to the turret housing 122 or 132, respectively, the axes of rotation 126 and 136 running approximately parallel to the spindle axes 42 and 62, respectively.

Provided circumferentially on the turret heads 124 and 134 are receptacles for tools 128 and 138, respectively, with which the workpieces W1 and W2 can be respectively machined.

According to the invention, in this case, the first tool carrier 120 is associated with the first working spindle 40 and the second tool carrier 130 is associated with the second working spindle 60, that is to say that all the tools 128 of the first tool carrier 120 are provided for the machining of the first workpiece W1 in the first working spindle 40, while all the tools 138 of the second tool carrier 130 are provided on the workpiece W2 held in the second working spindle 60.

According to the invention, in the case of the first exemplary embodiment, a third tool carrier 140, which is associated with the first working spindle 40, and a fourth tool carrier 150, which is associated with the second working spindle 60, are provided in addition to the first tool carrier.

Both the third tool carrier 140 and the fourth tool carrier 150 are formed as tool turrets and comprise a turret housing 142 or 152, respectively, on which a turret head 144 or 154 is mounted rotatably about a turret axis 146 or 156, respectively.

Respectively disposed on the turret head 144 or 154 are tools 148 and 158, the tools 148 of the turret head 144 being provided for the machining of the workpiece W1 and the tools 158 of the turret head 154 being provided for the machining of the workpiece W2. Consequently, the entire third tool carrier 140 is associated with the first working spindle 40 and the entire fourth tool carrier 150 is associated with the second working spindle 60.

The third tool carrier 140 and the fourth tool carrier 150 are in this case seated on an X slide 160 or 170, respectively associated with them, and these X slides 160 and 170 are for their part again guided on a Z slide 180 or 190 respectively serving as a base body for them, the Z slides 180 and 190 in each case having only two guiding carriages 182a and 182b or 192a and 192b, respectively, and being guided by these on the Z guides 16a and 16b for the spindle housing carrier slides 30 and 50.

Since the support of the Z slides 180 and 190 by only two guiding carriages 182a and 182b or 192a and 192b on the Z guides 16a and 16b, respectively, does not offer adequate resistance to tilting, but can only accept supporting forces which lie in planes 183 and 193 running transversely to the Z guides 16a, b, each of the Z slides 180 and 190 is provided with an arm 184 or 194, respectively, which extends from the respective Z slide 180 or 190 in the direction of the spindle housing carrier slide 30 or 50, respectively, which carries the working spindle 40 or 60 associated with the third tool carrier 140 or fourth tool carrier 150, respectively.

The respective arm 184 or 194 is in this case preferably formed as a sleeve, which is passed through by a longitudinal guide 186 or 196, for example a sleeve guide, in the respective spindle housing carrier slide 30 or 50 and is guided in the latter in the Z direction in a linearly movable manner in relation to the spindle housing carrier slide 30 or 50, respectively, so that the guidance of the arm 184 or 194, or rather of the sleeve 184 or 194 in the corresponding sleeve guide 186 or 196, in the corresponding spindle housing carrier slide 30 or 50 brings about additional support of the respective Z slide 180 or 190, and consequently overall together with the guiding carriages 182*a, b* and 192*a, b* stable tripod-like support against tilting of the slides 180 and 190 in the direction of the associated spindle housing carrier slide 30 or 50 or away from the latter, and this altogether threefold guidance of the Z slide 180 or 190 means that support of this Z slide on only one guiding carriage 182*a, b* or 192*a, b* is adequate, so that the Z slide 170 or 180 must only have an extent in the Z direction adequate for receiving a guiding carriage 182*a, b* or 192*a, b* that does not provide support against tilting.

The extent of the Z slides in the Z direction is preferably at most half the extent of the respective spindle housing carrier slide 30 or 50 in the region of the guiding carriages 32 and 34 or 52 and 54, respectively, in the Z direction.

This allows the spindle housings 36 and 56 with the working spindles 40 and 60 to be disposed on the spindle housing carrier slides 30 and 50 in such a way that the working spindles project as little as possible with respect to the spindle housing carrier slides 30 and 50 up to the respective workpiece receptacle 48 or 68, respectively.

Furthermore, held on the respective arm 184 or 194, to be precise at an end opposite from the respective Z slide 180 or 190, is a drive carrier 188 or 198, respectively, on which there can be mounted a Z axial drive 200 or 210, which drives an adjusting spindle 202 or 212, which runs with its axis parallel to the Z direction and the spindle nut 204 or 214 of which is firmly held on the associated spindle housing carrier slide 30 or 50, respectively.

With a threaded spindle drive 202, 204 or 212, 214 of this type, the arm 184 or 194 can be positioned in a controlled manner in relation to the spindle housing carrier slide 30 or 50, respectively, completely independently of the Z position of the same in relation to the machine frame 10, the required Z axial drive 200 or 210 not requiring any space between the spindle housing carrier slides 30, 50, but it instead being possible for it to be disposed on an outer side of the arms 184 or 194, respectively, facing away from a working space A.

In addition, respectively provided on the drive carrier 188 or 198 is an X axial drive 206 or 216, which is capable by means of a drive shaft 208 or 218 running through the respective arm 184 or 194 of driving an adjusting mechanism (not represented in the drawing) for the X slide 160 or 170, with which the latter can be moved with respect to the respective Z slide 180 or 190.

For guiding the X slides 160 and 170 in relation to the Z slides 180 and 190, the X slides 160 and 170 are provided, as represented in FIG. 2, on edge areas 162*a, b* and 172*a, b* of their edge sides 164*a, b* and 174*a, b* with X guides 166*a, b* and 176*a, b*, respectively, which are seated on said edge areas and interact with guiding carriages 168*a, b* and 178*a, b*, respectively, the guiding carriages 168*a, b* and 178*a, b* being disposed in a stationary manner on the respective Z slide 180 or 190.

In this case, the guiding carriages 168*a, b* and 178*a, b* are preferably held on guiding end pieces 169*a, b* or 179*a, b* reaching beyond the X slides 160 and 170 in the region of their edges 164*a, b* and 174*a, b*, so that the Z slides 180 and 190 are as slender as possible in the Z direction.

Consequently, the X guides 166*a, b* and 176*a, b* respectively fix X guiding planes 167 and 177 which run perpendicularly to the Z direction, and consequently make it possible to guide the respective X slide 160 or 170 stably with respect to tilting on the Z slide 180 or 190 in the X direction, the spacing between the X guides 166*a* and 166*b* or 176*a* and 176*b* not having any adverse effects on the extent of the respective Z slides 180 and 190 in the Z direction, since the X guiding planes 167 and 177 run perpendicularly to the Z direction.

Consequently, the alignment of the X guiding plane 167 or 177 in relation to the respective Z slide 180 or 190 also contributes to obtaining altogether a slide system for the respective tool carrier 140 or 150 which has in the Z direction an overall extent which corresponds at most to half the extent of the spindle housing carrier slides 30 and 50 in the Z direction.

The lathe according to the invention further comprises, as represented in FIGS. 3 and 4, a machine control unit 230, with which a drive motor 240 of a first linear drive 242 for the first spindle housing carrier slide 30 can be activated and also a drive motor 250 of a second linear drive 252 for the second spindle housing carrier slide 50, so that both spindle housing carrier slides 30 and 50 are displaceable in a controlled manner in the Z direction.

In addition, the machine control unit 230 can be used to activate the Z axial drives 200 and 210, by means of which the Z slides 180 and 190 can be positioned in relation to the respective spindle housing carrier slide 30, 50 on the basis of the threaded spindle drives 202, 204 and 212, 214, to be precise in relation to the respective working spindle 40 or 60, the positioning of the tools 148 or 158 in relation to the respective first workpiece W1 or second workpiece W2 being independent of the Z position of the working spindles 40 and 60, so that, for the machining of the workpieces W1 and W2 by the tools 148 and 158, the machine control unit 230 merely has to activate the Z axial drive 200 or 210, respectively.

The displaceability of the working spindles 40 and 60 in relation to each other can consequently not only be used for transferring the workpiece W from the first working spindle 40 to the second working spindle 60, or vice versa, but also be used for providing that, for example for machining the first workpiece with a tool 128 of the first tool carrier 120, the Z axial movement is performed by movement of the spindle housing carrier slide 30 in relation to the machine bed 12, so that it is not necessary for the first tool carrier 120 to be made to move in the Z direction by means of the first tool slide carrier 80.

In the same way, for machining the second workpiece W2 by means of a tool 138 of the second tool carrier 130, the Z movement can likewise be performed by making the working spindle 60 move together with the spindle housing carrier slide 50 in the Z direction, so that the tool slide carrier 90 itself likewise does not have to be made to move.

Finally, however, the machine control unit 230 also allows displacement of the tool slide carriers 80 and 90 in the Z direction by means of threaded spindle drives, the threaded spindle drive 254 for the second tool slide carrier 90 being represented in FIGS. 3 and 4.

Furthermore, the machine control unit 230 makes it possible to control the working spindles 40, 60 of the movements of the X slides 100 and 110 and also 160 and 170 in the X direction, that is to say transversely to the spindle axes 42 and 62, and finally also to control the turret heads 124, 134, 144 and 154 by rotating the same about their respective axis 126, 136, 146 and 156.

Figure 5:
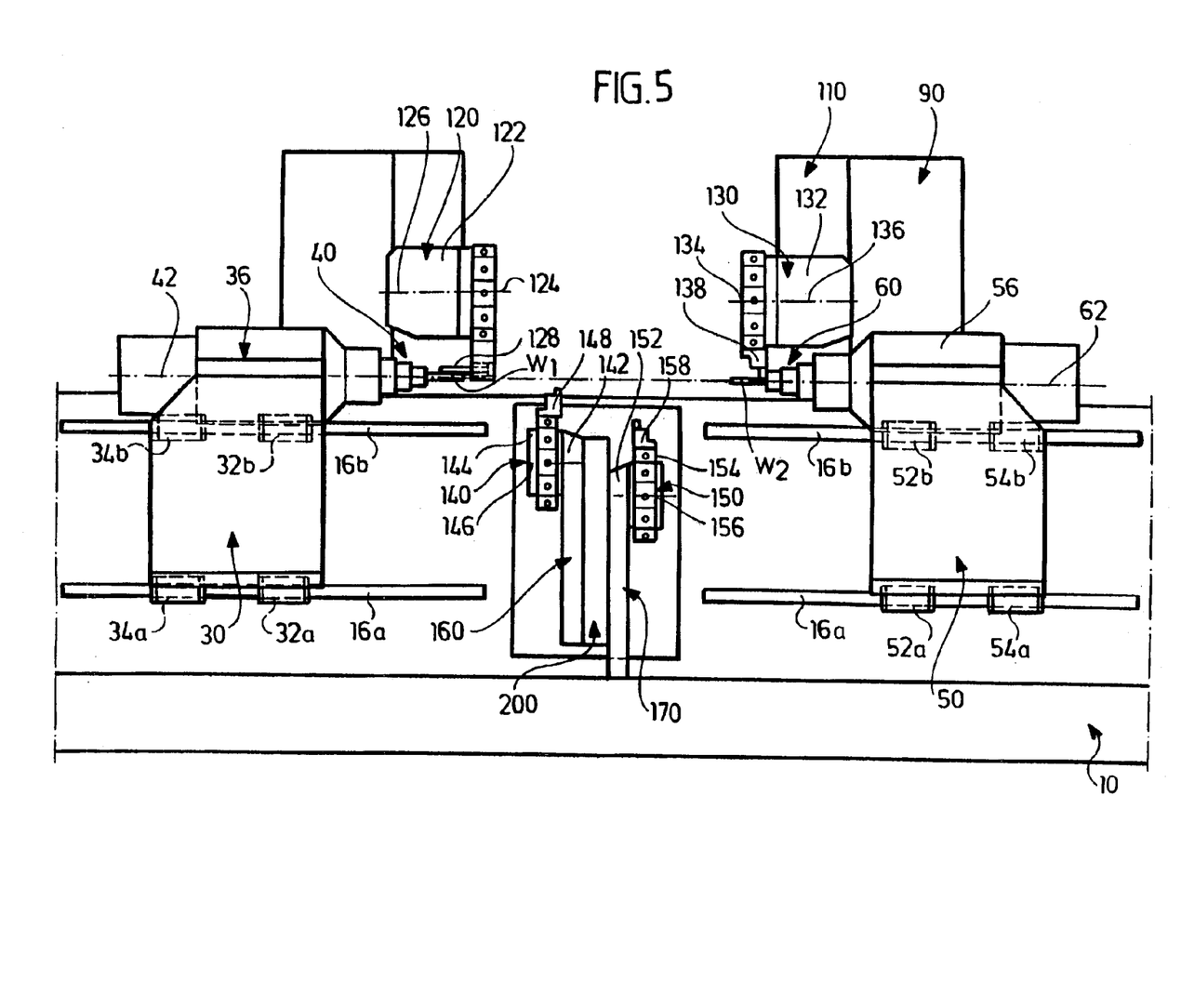
FIG. 5 shows a section similar to FIG. 1 through a second exemplary embodiment and FIG. 6 shows a plan view similar to FIG. 2 in the case of the second exemplary embodiment.
Figure 6:
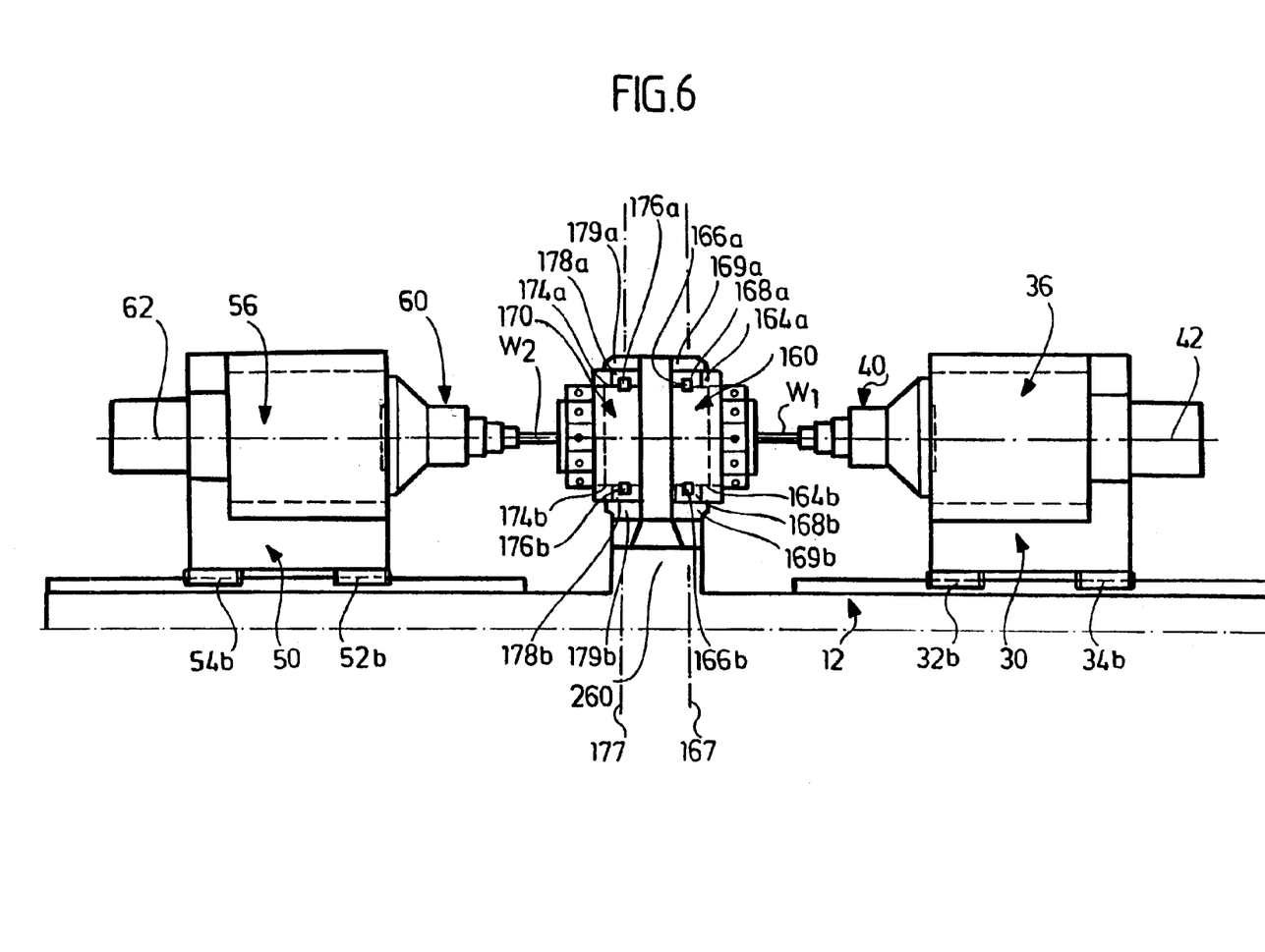

A second exemplary embodiment of a lathe according to the invention, represented in FIGS. 5 and 6, represents a simplified embodiment of the first exemplary embodiment, the same parts being provided with the same reference numerals, so that, with regard to the description of the same, reference can be made to the first exemplary embodiment in full.

By contrast with the first exemplary embodiment, in the case of the second exemplary embodiment, representing a simplified embodiment, the X slides 160 and 170 are not disposed on corresponding Z slides, but instead are seated on a common slide base 260, which is disposed in a stationary manner on the machine bed 12 and is connected to the latter.

The slide base 260 has for its part the end pieces 169a, b and 179a, b, seated on which are the guiding carriages 168a, b and 178a, b, in which the X guides 166a, b and 176a, b are guided, which for their part once again are seated on the edge sides 164a, b and 174a, b of the X slides 160 and 170, respectively, and guide the latter, the X guiding planes 167 and 177 in the same way as in the case of the first exemplary embodiment likewise being perpendicular to the spindle axes 42 and 62, respectively.

Consequently, the X slides 160 and 170 together with the slide base 260 are likewise constructed in the Z direction in such a way that their extent in the Z direction is less than two thirds of the extent of the spindle housing carrier slides 30 and 50 in the Z direction.

In the case of the second exemplary embodiment of the lathe according to the invention, it is absolutely necessary for the machining of the workpieces W1 and W2 to move the working spindles 40 and 60 in relation to the tools 148 and 158 of the third tool carrier 140 and fourth tool carrier 150, respectively, to allow the workpieces W1 and W2 to be machined Z-dependently.

In addition, it is necessary in the case of the second exemplary embodiment to move the first tool carrier 120 and the second tool carrier 130 in relation to the working spindles 40 and 60, so that Z-dependent machining of the workpieces W1 and W2 is likewise possible with the tools 128 and 138 of said tool carriers.

Otherwise, the machine control unit of the second exemplary embodiment controls the X movements of the X slides 100, 110, 160 and 170 in the same way as described in connection with the first exemplary embodiment.

What is claimed is:

1. Machine tool, comprising:
a machine frame;
a first spindle housing carrier and a second spindle housing carrier disposed on said machine frame in such a way that they can be moved in a Z direction in relation to each other;
a first working spindle, which receives a first workpiece and is mounted rotatably about a first spindle axis in a first spindle housing seated on the first spindle housing carrier, said first spindle housing carrier extending laterally away from said first spindle housing parallel to a first lateral direction;
a second working spindle, which is disposed coaxially with respect to the first working spindle, receives a second workpiece and is mounted rotatably about a second spindle axis in a second spindle housing seated on the second spindle housing carrier, said second spindle housing carrier extending laterally away from said second spindle housing parallel to said first lateral direction;
a first tool carrier, which is movable in an X direction and is associated with the first working spindle for the machining of the first workpiece, disposed in the first working spindle, said first tool carrier and said first spindle housing carrier being arranged on approximately opposite sides of said first spindle axis;
a second tool carrier, which is movable in an X direction and is associated with the second working spindle for the machining of the second workpiece, disposed in the second working spindle, said second tool carrier and said second spindle housing carrier being arranged on approximately opposite sides of said second spindle axis;
the first and second tool carriers being disposed on the same side of the spindle axis;
a machine control unit for controlling the relative movements between the first workpiece and the tools of the first tool carrier and the second workpiece and the tools of the second tool carrier; and
a third tool carrier, moveable at least in an X direction and associated with one of the working spindles, said third tool carrier being provided between the spindle housing carriers of the first and second working spindles on a side of the spindle axes which is approximately opposite from the first and second tool carriers.

2. Machine tool, comprising:
a machine frame;
a first spindle housing carrier and a second spindle housing carrier disposed on said machine frame in such a way that they can be moved in a Z direction in relation to each other;
a first working spindle, which receives a first workpiece and is mounted rotatably about a spindle axis in a first spindle housing seated on the first spindle housing carrier, said first spindle housing carrier extending laterally away from said first spindle housing parallel to a first lateral direction;
a second working spindle, which is disposed coaxially with respect to the first working spindle, receives a second workpiece and is mounted rotatably about a spindle axis in a second spindle housing seated on the second spindle housing carrier, said second spindle housing carrier extending laterally away from said second spindle housing parallel to said first lateral direction;
a first tool carrier, which is moveable in an X direction and is associated with the first working spindle for the machining of the first workpiece;
a second tool carrier, which is moveable in an X direction and is associated with the second working spindle for the machining of the second workpiece;
the first and second tool carriers being disposed on the same side of the spindle axis;
a machine control unit for controlling the relative movements between the first workpiece and tools of the first tool carrier and the second workpiece and tools of the second tool carrier;
and a third tool carrier, moveable at least in an X direction and associated with one of the working spindles, said third tool carrier being provided between the spindle housing carriers of the first and second working spindles on a side of the spindle axes which is approximately opposite from the first and second tool carriers,
wherein the third tool carrier is disposed on an X slide, which is guided on an X slide base by X guides disposed in an X guiding plane perpendicular to the spindle axes.

3. Machine tool according to claim 2, wherein a fourth tool carrier is disposed between the first and second spindle housing carriers and the third tool carrier is associated with the first working spindle and the fourth tool carrier is associated with the second working spindle.

4. Machine tool according to claim 3, wherein the fourth tool carrier is disposed on an X slide which is guided on an X slide base by X guides disposed in the X guiding plane perpendicular to the spindle axes.

5. Machine tool according to claim 3, wherein the third tool carrier and the fourth tool carrier are seated on respective X slides.

6. Machine tool according to claim 5, wherein the X slide of the third tool carrier and the X slide of the fourth tool carrier are seated on a common X slide base.

7. Machine tool according to claim 5, wherein each of the X slides has a respective X slide base.

8. Machine tool according to claim 2, wherein the X guides have in the transverse direction running in the X guiding plane and transversely to the X direction a spacing from each other which corresponds at least to an effective diameter of the workpiece receptacle in the respective working spindles.

9. Machine tool according to claim 2, wherein the X guides have in a transverse direction running in the X guiding plane and transversely to the X direction a spacing from each other which is of the order of magnitude of an extent of the respective tool carrier in the transverse direction.

10. Machine tool according to claim 2, wherein the X slide has a slide body which is guided by the X guides close to its edge sides that are spaced apart in the transverse direction.

11. Machine tool according to claim 2, wherein the slide body is guided by the X guides seated on edge surfaces running transversely to the X guiding plane.

12. Machine tool according to claim 2, wherein the X slide base is formed as a Z slide guided by Z guides.

13. Machine tool, comprising:
a machine frame;
a first spindle housing carrier and a second spindle housing carrier disposed on said machine frame in such a way that they can be moved in a Z direction in relation to each other;
a first working spindle, which receives a first workpiece and is mounted rotatably about a spindle axis in a first spindle housing seated on the first spindle housing carrier, said first spindle housing carrier extending laterally away from said first spindle housing parallel to a first lateral direction;
a second working spindle, which is disposed coaxially with respect to the first working spindle, receives second workpiece and is mounted rotatably about a spindle axis in a second spindle housing seated on the second spindle housing carrier, said second housing carrier extending laterally away from said second spindle housing parallel to said first lateral direction; and
a tool carrier, moveable at least in an X direction and associated with one of the working spindles, said tool carrier being provided between the spindle housing carriers of the first and second working spindles on the same side of the spindle axes;
wherein the tool carrier is disposed on an X slide, which is guided on an X slide base, a Z slide carrying said X slide base and being guided on Z slides on said machine frame, said Z slide being further guided by a Z guide on the spindle housing carrier which has its working spindle associated with the tool carrier disposed on the Z slide.

14. Machine tool according to claim 13, wherein the Z guide has an arm which extends from the Z slide in the direction of at least one of the spindle housing carriers.

15. Machine tool according to claim 14, wherein the arm extends beyond the spindle housing carrier.

16. Machine tool according to claim 14, wherein the arm extends through a Z guiding receptacle for said arm which is disposed on the spindle housing carrier.

17. Machine tool according to claim 14, wherein a Z axial drive is provided, with which the Z slide can be moved in relation to the respective spindle housing carrier.

18. Machine tool according to claim 17, wherein a Z axial drive is effective between the arm and the spindle housing carrier.

19. Machine tool according to claim 18, wherein a drive motor for the Z axial drive is held by the arm.

20. Machine tool according to claim 14, wherein an X axial drive motor for the X slide is disposed at an end of the arm opposite from the Z slide.

21. Machine tool according to claim 20, wherein a drive train extends along the arm between the X axial drive motor and the Z slide.

22. Machine tool according to claim 21, wherein the drive train is led through the arm.

23. Machine tool according to claim 13, wherein the Z slide is supported by at least one guiding element on a Z guide provided on the machine frame.

24. Machine tool according to claim 23, wherein the Z slide is guided by the guiding element respectively on one of two Z guides disposed on the machine frame.

25. Machine tool according to claim 23, wherein at least one of the guiding elements is guided on the corresponding Z guide with a guiding length in the Z direction which is less than a guiding length accepting tilting moments of the Z slide.

26. Machine tool according to claim 23, wherein at least one of the guiding elements is guided on the corresponding Z guide in such a way that the latter only accept forces lying in a plane running transversely to the Z direction.

27. Machine tool according to claim 12, wherein the Z guides disposed on the machine frame are also formed as Z guides of a further slide guided on the machine frame.

28. Machine tool according to claim 13, wherein at least one of the spindle housing carriers forms a spindle housing carrier slide which can be made to move in the Z direction for the working spindle carried by said slide.

29. Machine tool according to claim 28, wherein both spindle housing carriers are formed as spindle housing carrier slides which can be made to move in the Z direction.

30. Machine tool according to claim 28, wherein a Z guiding plane, in which the Z guides for the spindle housing carrier slide lie, runs transversely to a setting-up area of the machine frame.

31. Machine tool according to claim 28, wherein the Z slide is guided at least on one of the two spaced-apart Z guides for the respective spindle housing carrier slide.

32. Machine tool according to claim 31, wherein the Z slide is guided on both the spaced-apart Z guides for the respective spindle housing carrier slide.

33. Machine tool, comprising:
a machine frame;
a first spindle housing carrier and a second spindle housing carrier disposed on said machine frame in such a way that they can be moved in a Z direction in relation to each other;

a first working spindle, which receives a first workpiece and is mounted rotatably about a spindle axis in a spindle housing seated on the first spindle housing carrier;

a second working spindle, which is disposed coaxially with respect to the first working spindle, receives a second workpiece and is mounted rotatably about a spindle axis in a spindle housing seated on the second spindle housing carrier;

a first tool carrier, which is moveable in an X direction and is associated with the first working spindle for the machining of the workpiece;

a second tool carrier, which is moveable in an X direction and is associated with the second working spindle for the machining of the second workpiece;

the first and second tool carriers being disposed on the same side of the spindle axis;

a third tool carrier, moveable at least in an X direction and associated with the first working spindle;

a fourth tool carrier moveable at least in an X direction associated with the second working spindle, said third and fourth tool carriers being provided on a side of the spindle axes which is approximately opposite from the first and second tool carriers;

a machine control unit for controlling the relative movements between the first workpiece and tools of the first tool carrier and the second workpiece and tools of the second tool carrier;

wherein with the machine control unit in a machining mode, the third tool carrier can be made to move in relation to the first working spindle and the fourth tool carrier can be made to move in relation to the second working spindle into Z positions required for the machining of the first workpiece and second workpiece, respectively.

34. Machine tool according to claim 33, wherein with the machine control unit in the machining mode, the first tool carrier and the first working spindle can be made to move in relation to each other into the Z positions required for the machining of the first workpiece.

35. Machine tool according to claim 33, wherein with the machine control unit in the machining mode, the second tool carrier and the second working spindle can be made to move in relation to each other into the Z positions required for the machining on the second workpiece.

36. Machine tool according to claim 1, wherein the third tool carrier carries tools which can be used at least on one of the workpieces, with the machine control unit in a machining mode, one of the working spindles being movable in relation to the third tool carrier in a way corresponding to Z positions required for the machining of the respective workpiece by means of the tool provided on the third tool carrier for this workpiece, and the tool carrier associated with this working spindle being movable in relation to this working spindle in a way corresponding to the Z positions required for the machining of this workpiece by means of the tool provided on this tool carrier, likewise associated with the working spindle.

37. Machine tool, comprising:
a machine frame;
a first spindle housing carrier and a second spindle housing carrier disposed on said machine frame in such a way that they can be moved in a Z direction in relation to each other;

a first working spindle, which receives a first workpiece and is mounted rotatably about a spindle axis in a spindle housing seated on the first spindle housing carrier;

a second working spindle, which is disposed coaxially with respect to the first working spindle, receives a second workpiece and is mounted rotatably about a spindle axis in a spindle housing seated on the second spindle housing carrier;

a first tool carrier, which is moveable in an X direction and is associated with the first working spindle for the machining of the first workpiece;

a second tool carrier, which is moveable in an X direction an is associated with the second working spindle for the machining of the second workpiece;

the first and second tool carriers being disposed on the same side of the spindle axis;

a third tool carrier, associated with the first working spindle;

a fourth tool carrier associated with the second working spindle, said third and fourth tool carriers being provided on a side of the spindle axes which is approximately opposite from the first and second tool carriers; and a machine control unit for controlling the relative movements between the first workpiece and tools of the first tool carrier and the second workpiece and tools of the second tool carrier;

wherein with the machine control unit in the machining mode, the first working spindle is moveable in relation to the third tool carrier and the second working spindle is moveable in relation to the fourth tool carrier into Z positions required for the machining of the first workpiece and second workpiece, respectively.

38. Machine tool according to claim 37, wherein the first tool carrier is movable in relation to the first working spindle and the second tool carrier is movable in relation to the second working spindle into the Z positions required for the machining.

39. Machine tool according to claim 13, wherein said tool carrier is a third tool carrier, said machine tool further comprising:
a first tool carrier, which is moveable in an X direction and is associated with the first working spindle for the machining of the first workpiece;

a second tool carrier, which is moveable in an X direction and is associated with the second working spindle for the machining of the second workpiece;

the first and second tool carriers being disposed on the same side of the spindle axis; and a machine control unit for controlling the relative movements between the first workpiece and tools of the first tool carrier and the second workpiece and tools of the second tool carrier.

40. Machine tool according to claim 13, wherein said tool carrier is associated with the first working spindle, comprising:
a further tool carrier moveable at least in an X direction associated with the second working spindle;
said tool carriers being provided on the same side of the spindle axes;
wherein with a machine control unit in a machining mode, the tool carrier can be made to move in relation to the first working spindle and the further tool carrier can be made to move in relation to the second working spindle into Z positions required for the machining of the first workpiece and second workpiece, respectively.

* * * * *

UNITED STATES PATENT AND TRADEMARK OFFICE
CERTIFICATE OF CORRECTION

PATENT NO. : 6,948,411 B2
DATED : September 27, 2005
INVENTOR(S) : Grossmann

It is certified that error appears in the above-identified patent and that said Letters Patent is hereby corrected as shown below:

Column 12,
Line 17, delete "the" before "tools".
Line 18, delete "the" before "tools".

Column 14,
Line 16, change "a" to -- the -- before "Z axial".
Line 44, change "claim 12" to -- claim 13 --.
Line 55, delete "the" before "Z guides".
Line 58, change "the" to -- a -- before "Z".

Signed and Sealed this

Thirty-first Day of January, 2006

JON W. DUDAS
*Director of the United States Patent and Trademark Office*